March 1, 1960  A. L. KOHL ET AL  2,926,751
ORGANIC CARBONATE PROCESS FOR CARBON DIOXIDE
Filed Sept. 22, 1958
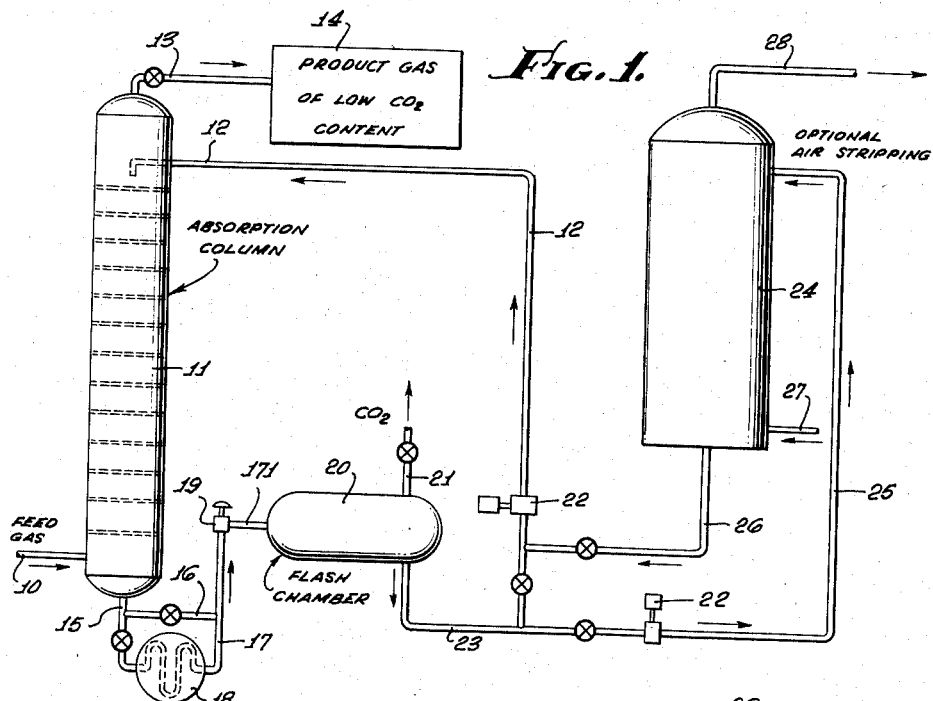
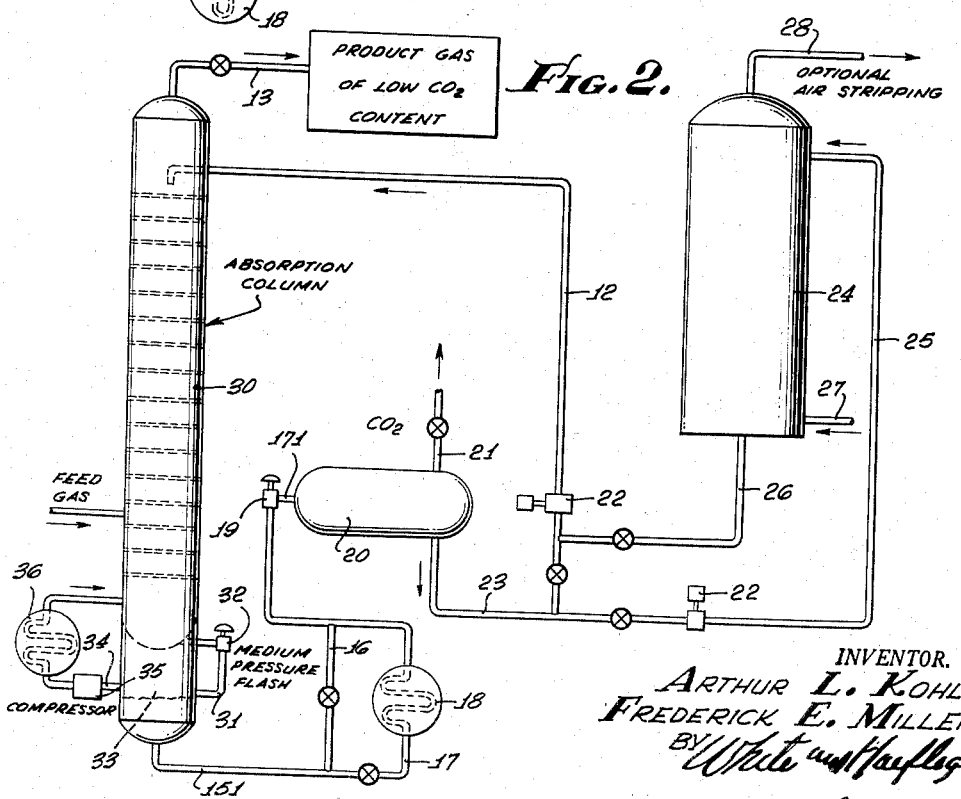
INVENTOR.
ARTHUR L. KOHL
FREDERICK E. MILLER
BY
ATTORNEYS.

United States Patent Office 2,926,751
Patented Mar. 1, 1960

2,926,751

ORGANIC CARBONATE PROCESS FOR CARBON DIOXIDE

Arthur L. Kohl and Frederick E. Miller, Whittier, Calif., assignors to The Fluor Corporation, Ltd., Los Angeles, Calif., a corporation of California Application September 22, 1958, Serial No. 762,625

11 Claims. (Cl. 183—115)

This invention has to do generally with the removal of carbon dioxide from gaseous mixtures which may contain also any of such other components as hydrogen, nitrogen, oxygen, moisture, air and hydrocarbons such as methane and natural gas. The gas may contain in some instances impurities such as hydrogen sulfide, carbonyl sulfide and possibly sulfur dioxide. More particularly, the invention relates to improvements in absorption-type processes for the separation or recovery of carbon dioxide from gaseous mixtures, characterized by superior practicability, efficiency and initial and operating economies of the process due to a combination of factors including the carbon dioxide absorption capacity of the absorbent, the ability to separate carbon dioxide from the rich absorbent without necessity for heating by effecting simple pressure reduction, and the chemical stability as well as physical properties of the absorbent that assure its continued usability and effectiveness in a recirculation system.

The invention is predicated primarily upon the use for such carbon dioxide separation or recovery, of propylene carbonate as an absorbent having selective or preferential solubility for carbon dioxide by simple dissolution of the gas in the absorbent without chemically affecting or reacting with the absorbent. The particular suitability of propylene carbonate as an efficient and practical carbon dioxide solvent, is indicated by the following tabulation of certain properties of propylene carbonate significant to its use in the present process.

TABLE I

| | Propylene carbonate |
|---|---|
| Freezing point | −49° C. |
| Specific gravity | 1.206. |
| Lb./gallon solution | 10.0. |
| pH (solvent in water) | 7.0. |
| Specific heat (B.t.u./lb./° F.) | 0.62 @ 80° F. |
| Viscosity, at 80° F. | 1.95 centistokes. |
| At 0° F. | 6.64 centistokes. |
| Vapor pressure at 80° F. | 0.05 mm. Hg. |
| Saturated water content 80° F. | 7.7 wt. percent. |
| Relative humidity of gas in equilibrium with propylene carbonate containing 1% $H_2O$ | 42%. |
| $CO_2$ solubility @ 80° F. | 3.40 s.c.f. gas/c.f. sol. |
| $CH_4$ solubility @ 80° F. | 0.11 s.c.f. gas/c.f. sol. |
| $N_2,O_2,H_2$ solubility @ 80° F. approx. | 0.02 s.c.f. gas/c.f. sol. |
| Heat of solution (of $CO_2$) B.t.u./lb. mol | 195. |

Heretofore it has been proposed to remove carbon dioxide from gaseous mixtures using other absorbents by processes employing the principle of simple dissolution, as distinguished from chemical reaction, of which the practice of scrubbing carbon dioxide-containing gases with water is illustrative and may be cited for the purposes of the following comparisons. The carbon dioxide dissolving capacity of propylene carbonate is over four times that of water and increases with increasing carbon dioxide partial pressure, and hence the plant size and cost required for any certain carbon dioxide removal capacity, are considerably less than where such absorbents as water may be used. The present process does not result in addition of water vapor to gas being treated (as do processes using water or water solutions), a point of importance in the case of carbon dioxide-containing natural gas, where corrosion and the problem of hydrate formation exists. In fact the present process permits absorption of both moisture and $CO_2$, and elimination of water from this solvent by simple flash-off. Propylene carbonate is non-corrosive to steel equipment both in the presence of air and carbon dioxide, and consequently maintenance as well as initial costs are relatively low.

Typical of processes which operate to recover carbon dioxide by chemical reaction with an absorbent, are regenerated systems employing amine and alkali carbonate solutions as the absorbents. These necessitate steam regeneration of the rich absorbent (anywhere from 80 to 250 pounds of steam per M c.f. $CO_2$ regenerated), whereas propylene carbonate requires no heating for satisfactory regeneration. The present absorbent presents no corrosion problems of the magnitude encountered in amine and alkali carbonate solutions and in the present process heat interchange between the rich and lean solutions is not usually required, or desirable.

Propylene carbonate has additional advantages over other physical solvents such as diesel oil or polyglycol ethers because of its higher carbon dioxide absorption capacity, stability, low hydrocarbon solubility and recoverability of any small amounts entrained in the purified gas. Even when subjected to hydrolytic decomposition, propylene carbonate decomposes to carbon dioxide, and non-objectionable propylene glycol. Other solvents to be found among certain polyglycol ethers tend to decompose to leave low volatility, low capacity hygroscopic and possibly corrosive products necessitating solution replacement.

One of the outstanding advantages of propylene carbonate as an absorbent, is its high solution capacities with superatmospheric carbon dioxide partial pressures. The present propylene carbonate process is best suited for operation in the absorption stage, with gases containing between 40 and 600 p.s.i.a. carbon dioxide inlet partial pressure and base temperatures in the absorber between about 40° F. and 90° F. Outlet absorber solution temperatures between 30° F. and 100° F. have been found practical for normal operation. The absorbent has the following equilibrium carrying capacities for carbon dioxide typically at 80° F. and 40° F.

TABLE II

| | $CO_2$ Pressure, p.s.i.g | | | |
|---|---|---|---|---|
| | 60 | 200 | 400 | 600 |
| S.c.f. $CO_2$/c.f. soln. @ 80° F. | 17 | 52.5 | 107 | 223. |
| S.c.f. $CO_2$/c.f. soln. @ 40° F. | 26.5 | 90 | 327 | infinitely soluble. |

Compared with the capacity of chemical solvents in the range of 10 to 30 s.c.f. per c.f. solution, with the attendant requirements for steam regeneration, the advantages of the present absorbent are apparent.

In terms of its operation, the present process contemplates passing a carbon dioxide-containing gas under pressure through an absorption zone countercurrently and in intimate contact with a solvent consisting essentially or principally of propylene carbonate, withdrawing the solvent from the absorption zone and subjecting it to pressure reduction and consequent flash-off of carbon dioxide in one or more consecutive chambers, and returning the regenerated or lean solution to the absorption zone for continuous cycling. Where the desired carbon dioxide partial pressure in the outlet gas leaving the absorption zone is lower than can be attained in a final flash stage, an additional treatment of the absorbent, such as countercurrent stripping with air or other inert gas, may be used to further deplete the solution of residual carbon dioxide. Reflashing of the solvent may occur at below atmospheric pressure in cases where introduction of any oxygen into the system is undesirable. As indicated, heat exchangers are not necessary in the present process, but may be used to provide lower operating temperatures and consequent increases in capacity.

The invention will be further understood from the following detailed description of the accompanying drawing, wherein:

Fig. 1 is a flow diagram illustrating one method of practicing the invention; and Fig. 2 is a similar view illustrative of contemplated modifications.

Referring first to Fig. 1, high pressure carbon dioxide-containing gas which typically may be at least partially saturated with water vapor and containing other impurities, is introduced typically at superatmospheric pressure through line 10 into the bottom of the absorption zone 11 which preferably is in the form of a vertically extended column containing appropriate packing or trays to assure intimate and multistage countercurrent contact of the rising feed gas with the down-flowing absorbent. High pressure is desired in the absorption zone 11 (within the pressure range corresponding to between 40 and 600 p.s.i.a. carbon dioxide partial pressure in the inlet gas) since pressure has the effect of increasing both the amount and rate at which carbon dioxide is absorbed.

Propylene carbonate is introduced to the top of the column 11 through line 12 to flow downwardly in intimate contact with the rising gas stream. The scrubbed gas is released through line 13 to a suitable receiver 14 or other disposition. With sufficient contacting stages in the column, the scrubbed gas will approach temperature and carbon dioxide pressure equilibrium with the in-coming propylene carbonate.

The rich absorbent containing dissolved carbon dioxide is released from the base of the colmn 11 through line 15 at a temperature higher than the lean solution returned through line 12 by the heat of absorption of the dissolved carbon dioxide and the sensible heat differences between the inlet and outlet gas streams. The rich stream in line 15 may be passed directly through line 16 to the later described flash chamber, or it may be taken by way of line 17 through a cooler 18 used to maintain the solution temperature at a desired constant level and thus afford a cooled solution which will increase the carbon dioxide absorptiveness of the lean solution when ultimately returned to the absorbent. It will be understood that the location of the cooling may be anywhere in the system, and that it is shown in line 17 only because this represents the location of the warmest available solution. The solution then undergoes a controlled pressure reduction and flashing through a valve 19 into flash chamber 20 that may be maintained at any pressure considerably below the absorption column pressure, and usually at about atmospheric pressure. In many cases the consequent temperature reduction may be sufficient to keep the systems' temperature somewhat below atmospheric temperature. To aid in equilibration, the line 171 between valve 19 and flash chamber 20 may be several diameters long and so designed as to provide turbulent concurrent contact between carbon dioxide gas and the flashing solvent. In this flash, the solvent not only loses the heat acquired in absorber 11, but also undergoes additional refrigeration due to the cooling effect of carbon dioxide expansion to a lower partial pressure. Valve 19 may be replaced in part or entirely by a power recovery device such as a turbine so that the power thus recovered can be used in the process to offset pumping costs or to provide refrigeration.

From the flash chamber 20, the released carbon dioxide is vented through line 21 to the atmosphere. This vent gas will generally contain most of the hydrogen sulfide, mercaptans and water vapor present in the inlet gas. The degased solution is now in equilibrium with carbon dioxide at the flash pressure and may be returned by pump 22 via lines 23 and 12 to the absorption column 11 for reuse with no further treatment. Where a lower carbon dioxide level is desired in the scrubbed high pressure gas than can be obtained by the simple flash, a conventional air stripping column 24 receiving some or all of the solution from line 23 and discharging through the return line 26, may be used to remove most of the remaining carbon dioxide from solution. Generally a rate of air introduction at 27 of from one to four s.c.f./gallon of solution is satisfactory for removal in three theoretical stripping stages of nearly all residual carbon dioxide overhead through line 28.

Fig. 2 shows a variational system designed for the removal of carbon dioxide from natural gas and other streams where hydrocarbon solubility is a problem. In this variation, the rich solution leaving the bottom of absorption column 30 through line 31 is reduced in pressure by valve 32 into medium pressure flash chamber 33. The pressure of this flash may be varied to suit design considerations, but generally lies between the operating pressure of the absorber and the vapor pressure of the dissolved carbon dioxide in the solvent. The relative volatility of methane can be anywhere from ten to thirty times that of carbon dioxide depending on temperatures and compositions and the gas taken from the medium pressure flash 33 will be concentrated in the formerly dissolved methane. This stream gas removed at 34, represents only a small portion of the total gas absorbed and may be used for fuel or recycled to the absorber for recovery by way of compressor 35 and after-cooler 36. The liquid from the medium pressure flash 33 is removed through line 151 to be treated in accordance with the stripping given the rich solution in line 15 of Fig. 1. Accordingly, corresponding reference numerals are used in lieu of further detailed description. It is necessary to provide this medium pressure flash where losses of hydrocarbons or other dissolved volatile gases must be kept to a minimum. For the removal of carbon dioxide from air, flue gas, and hydrogen, the purpose of multiple pressure flashes might be to purify carbon dioxide from unwanted gases such as hydrogen (more volatile) or mercaptans (less volatility). The heart cut so obtained would be reasonably pure carbon dioxide and need little further treatment.

For best operation, the propylene carbonate absorbent should not contain over 2 percent water. Due to the low hygroscopicity of the solvent, this is not a difficult condition to provide for and the solvent may efficiently be used to treat the gas stream for combined removal of carbon dioxide and water. A water material balance can be made on any processing scheme selected and absorption and flash temperatures adjusted to maintain a given condition. The presence of even small amounts of water in the system raises the question of hydrolysis. Measurements made at temperatures as high as 160° F. indicate hydrolysis in solution containing less than 2 percent water is insignificant over times as long as one year. Similar results were obtained in studies on the rates of oxidation under air stripping.

The following examples are illustrative of operating conditions that may be used in practicing the present invention.

Example I

A mixture of 45 percent carbon dioxide in hydrogen saturated at 80° F. and 350 p.s.i.g. was introduced into the bottom of a packed 1" absorption column (corresponding to column 11), the packing consisting of twelve feet of ¼" Raschig rings. Propylene carbonate previously air-stripped was pumped to the top of the absorber at a temperature approximately 70° F. at the rate of 94 gallons/M s.c.f. entering gas. The liquid solution contacting the rising gas stream countercurrently, effectively scrubbed the carbon dioxide from the gas, leaving a residue of only 0.12 percent in the product hydrogen. The carbonate solution heated (heat of absorption) to 82° F., and absorbed 4.8 s.c.f. of carbon dioxide per gallon of propylene carbonate. The rich solution was then reduced in pressure in an atmospheric flash (corresponding to chamber 20) where 90 percent of the carbon dioxide absorbed was released, and the solution was returned to the 70° F. liquid inlet temperature. The atmospheric flash gas consisted of 89.5 percent carbon dioxide and 1.5 percent dissolved hydrogen. The system was also operated to further deplete the absorbent by air stripping at 70° F. in a 27 tray column (corresponding to column 24) using 1.8 s.c.f. air per gallon of solution, which effectively reduced the carbon dioxide content of the liquid to an insignificant amount. The solution was then pumped to the 350 p.s.i.g. absorber for further use.

The approach to equilibrium in this case was approximately 90 percent and represented a carrying capacity 40 percent higher than typical amine solutions with much lower operating costs and simpler, less expensive equipment. The solution maintained itself at an equilibrium water content of 0.4 wt. percent, and at the same time the water content of the treated gas was lowered from saturated at 80° F. to twenty percent relative humidity at 70° F.

Example II

A natural gas mixture consisting of 50 percent carbon dioxide in methane, saturated with water at 80° F. and 800 p.s.i.g. was fed into the bottom of a packed 1" absorption column packing consisting of eight feet of ¼" Raschig rings. Propylene carbonate from an atmospheric flash was pumped into the top of the absorber at a temperature of 45° F. and a rate of 41 gallons/M c.f. enter- in gas. The liquid solution, contacting the rising gas stream countercurrently, scrubbed the carbon dioxide in the natural gas to a level of 2.5 percent which meets most pipeline specifications. The saturated solution leaving the column increased in temperature to 90° F. as a result of absorbing 13.2 s.c.f. carbon dioxide/gallon and 1.5 s.c.f. methane/gallon. The rich solution was then reduced in pressure to one atmosphere and a carbon dioxide stream containing 10.5 percent methane vented. The vented solution, now 43° F., was warmed to the 45° F. level and pumped to the absorber with 0.8 s.c.f. carbon dioxide gallon remaining in solution. (The carrying capacity of the solution in this case was 350 percent greater than amine solutions now in use.) In addition, the scrubbed sendout gas was dehydrated to 1.3 lb. water per MM s.c.f. well below the level required by natural gas pipelines. The loss of approximately eleven percent of the methane in the flashed gas is more than offset by the low equipment and operating costs of the process.

Example III

In this example, the gas treatment of the previous example includes the medium pressure recycle flash shown in Figure 2. A natural gas mixture consisting of 50 percent carbon dioxide in methane saturated with water at 80° F. and 800 p.s.i.g. is fed into a 1" packed absorption column at an intermediate point with 7½ ft. of ¼" Raschig rings above the feed entry and 2 ft. of ¼" Raschig rings below the feed entry. Propylene carbonate from the atmospheric flash was pumped into the top of the absorber at a temperature of 44° F. and a rate of 45.6 gallons/M c.f. of entering gas. At the base of the column a recycle gas stream of 70 percent carbon dioxide natural gas entered. The liquid, solution, contacting the rising gas streams countercurrently, scrubbed the carbon dioxide in the natural gas to a level of 2.5 percent as before. The saturated solution leaving the column increased in temperature to 90° F. as a result of absorbing a total of 13.5 s.c.f. carbon dioxide/gal. and 1.5 s.c.f methane/gal. The rich solution was then reduced from 800 p.s.i.g. to 400 p.s.i.g. with the consequent flashing of approximately four s.c.f./gal. of the dissolved gases. This medium pressure stream, a 70 percent carbon dioxide natural gas, was recycled via a single stage compressor to the absorber base at a temperature of 90° F. for methane recovery, and the liquid flashed to one atmosphere in a second flash chamber. Approximately 10 s.c.f./gal. of 97 percent carbon dioxide was removed in this step, (a 300 percent increase in capacity over amine solutions and a 75 percent saving in the methane lost in example II). The scrubbed sendout gas was also found to be low in water with a 1.5 lb. water/MM s.c.f gas produced. The relative value of operating a medium pressure flash depends on the value accorded the gas lost.

We claim:

1. The process of recovering carbon dioxide from a feed gas mixture containing carbon dioxide and a component of the group consisting of hydrogen, hydrogen sulfide, hydrocarbons, nitrogen, oxygen, moisture and air that includes passing the feed gas through an absorption zone at superatmospheric pressure in counter-flowing contact with propylene carbonate and thereby preferentially absorbing carbon dioxide in the carbonate, removing unabsorbed components of the feed gas from said zone, separately removing therefrom a stream of the rich carbonate and reducing the pressure thereto to flash-off carbon dioxide, and thereafter recycling the lean carbonate to said absorption zone for counter-flow contact with said feed gas.

2. The process of claim 1, in which removal of carbon dioxide from the rich carbonate occurs without the addition of heat thereto.

3. The process of claim 1, in which the lean carbonate returned to the absorption zone contains water in an amount up to about 2%.

4. The process of claim 1, in which the carbon dioxide partial pressure in the feed gas to the absorption zone is between about 40 and 600 p.s.i.a.

5. The process of claim 4, in which the base temperature in the absorption zone is between about 40° F. and 90° F.

6. The process of claim 4, in which the rich carbonate contains moisture absorbed from the feed gas and absorbed moisture is flashed-off with carbon dioxide from the rich solution by virtue of the pressure reduction.

7. The process of claim 1, in which the carbonate removed from the absorption zone is cooled before return thereto by means other than said pressure reduction.

8. The process of claim 1, in which residual carbon dioxide is removed from the carbonate stream following said pressure reduction and the resulting carbon dioxide removal.

9. The process of claim 8, in which said residual carbon dioxide removal from the carbonate stream is effected by inert gas stripping of the carbonate stream.

10. The process of claim 1, in which pressure reduction of the rich carbonate removed from the absorption zone occurs in successive stages from the first of which the flashed-off gas is compressed and returned to said zone.

11. The process of claim 11, in which the propylene carbonate is passed from said zone downwardly through a second zone from which said rich carbonate is removed and then subjected to successive stage pressure reduction from the first of which the flashed-off gas is compressed and returned to the bottom of said second zone.

References Cited in the file of this patent

UNITED STATES PATENTS

| | | |
|---|---|---|
| 1,934,472 | Allen et al. | Nov. 7, 1933 |
| 2,540,905 | Neubauer et al. | Feb. 6, 1951 |
| 2,638,405 | Frazier | May 12, 1953 |
| 2,649,166 | Porter et al. | Aug. 18, 1953 |
| 2,781,862 | Fussman | Feb. 19, 1957 |

OTHER REFERENCES

"A Dictionary of Chemical Solubilities," by Comey and Hahn, Macmillan Co., New York, New York, page 173.

UNITED STATES PATENT OFFICE

CERTIFICATE OF CORRECTION

Patent No. 2,926,751

March 1, 1960

Arthur L. Kohl et al.

It is hereby certified that error appears in the printed specification of the above numbered patent requiring correction and that the said Letters Patent should read as corrected below.

Column 5, line 20, for "89.5 percent" read -- 98.5 percent --; column 6, line 72, for the claim reference numeral "11" read -- 1 --.

Signed and sealed this 6th day of December 1960.

(SEAL)
Attest:
KARL H. AXLINE
Attesting Officer

ROBERT C. WATSON
Commissioner of Patents